UNITED STATES PATENT OFFICE.

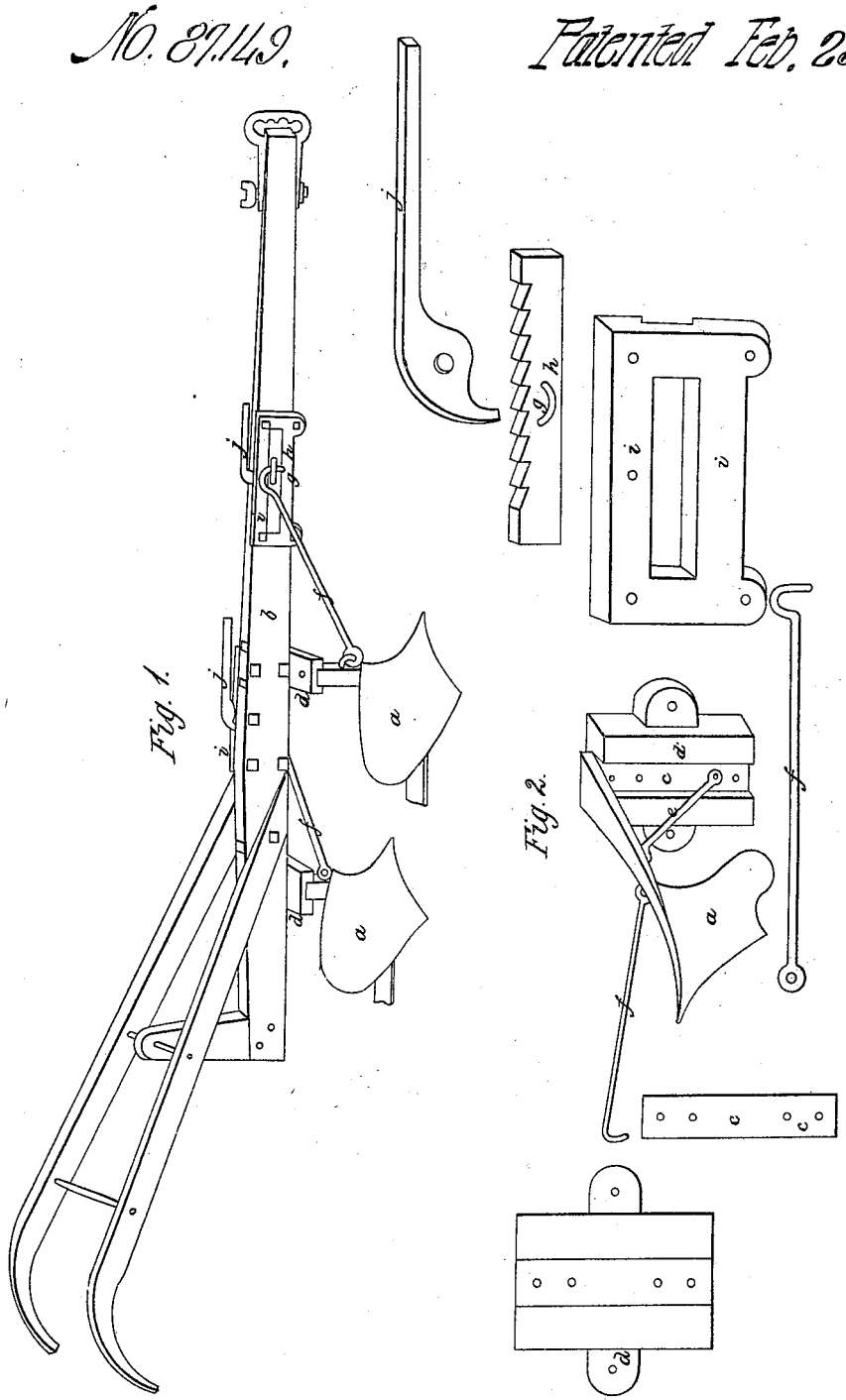

SEYMOUR CURTIS, OF FITCHBURG, WISCONSIN.

Letters Patent No. 87,149, dated February 23, 1869.

IMPROVEMENT IN PLOWS.

The Schedule referred to in these Letters Patent and making part of the same.

*To all whom it may concern:*

Be it known that I, SEYMOUR CURTIS, of the town of Fitchburg, in the county of Dane, in the State of Wisconsin, have invented certain new and useful Improvements in Expanding and Contracting Corn-Plows or Cultivators, for plowing and cultivating corn and other growing crops; and I do hereby declare that the following is a full and exact description thereof, reference being had to the accompanying drawings, which are made a part of this specification, and to the letters of reference marked thereon.

The nature of my invention consists in a new and improved mode of manufacturing a corn-plow, so that it will expand and contract, and thereby more thoroughly cultivate the soil around the plant, such as corn and the like.

To enable others skilled in the art to make and use my invention, I will proceed to describe its construction and operation.

In the drawings—

Figure 1 represents the finished plow.

Figure 2 is an underneath view of the plow-iron, secured to the slide-plate, that secures it to the plow-beam underneath by bolts.

Figures 3, 4, 5, 6, 7, and 8, detail views of the respective parts composing the improvements.

To more fully explain the separate parts, $a\ a$ represent the irons of the plow, of the usual form, secured to the beam, $b$, by the slides $c\ c$, in the slide-plates $d\ d$, and bolted crosswise underneath the plow-beam $b$, and strengthened and secured, at their desired points, by the braces $c\ c$ and rods $f\ f$, hooked to the staples $g\ g$, on the slides $h\ h$, movable in the slide-plates $i\ i$, bolted, one on each side of the plow-beam $b$, lengthwise, easily adjusted and movable, and secured by the levers $j\ j$, in connection with the teeth on the slide-plates $h\ h$.

Also, the slides $c\ c$ are movable, and secured, at any desired point of the slide-plates $d\ d$, by moving a bolt from one hole to another slide-bolt hole.

From the above description, it is apparent that it is easily expanded or contracted at pleasure, strong and secure; or one of the irons may be left off, making a single plow, or made in pairs, one turning to the right, the other to the left.

I do not claim the double plow, nor the expanding-cultivator.

What I claim, is—

1. The plow-irons $a\ a$, secured to slides $c\ c$, moving in slide-plates $d\ d$, bolted to the under side of plow-beam $b$ crosswise.

2. Staples $g\ g$, on slides $h\ h$, movable in slide-plates $i\ i$, bolted, one on each side of plow-beam $b$, in connection with the levers $j\ j$ and rods $f\ f$, or their equivalents, for the purposes specified and described.

SEYMOUR CURTIS.

Witnesses:
 WM. F. VILAS,
 HENRY VILAS.